(12) United States Patent
Lee

(10) Patent No.: US 11,227,211 B2
(45) Date of Patent: Jan. 18, 2022

(54) NEUROMORPHIC DEVICE INCLUDING A SYNAPSE HAVING A PLURALITY OF SYNAPSE CELLS

(71) Applicant: SK hynix Inc., Gyeonggi-do (KR)

(72) Inventor: Hyung-Dong Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 1138 days.

(21) Appl. No.: 15/715,293

(22) Filed: Sep. 26, 2017

(65) Prior Publication Data

US 2018/0225566 A1    Aug. 9, 2018

(30) Foreign Application Priority Data

Feb. 3, 2017 (KR) .................. 10-2017-0015560

(51) Int. Cl.
*G06N 3/063* (2006.01)
*G06N 3/04* (2006.01)

(52) U.S. Cl.
CPC .......... *G06N 3/0635* (2013.01); *G06N 3/04* (2013.01); *G06N 3/049* (2013.01)

(58) Field of Classification Search
CPC ....... G06N 3/063; G06N 3/0635; G06N 3/049
See application file for complete search history.

(56) References Cited

U.S. PATENT DOCUMENTS

2017/0083810 A1*    3/2017   Ielmini ................. G06N 3/063

FOREIGN PATENT DOCUMENTS

KR    1020130119436    10/2013

OTHER PUBLICATIONS

Garbin, Daniele, et al. "HfO 2-based OxRAM devices as synapses for convolutional neural networks." IEEE Transactions on Electron Devices 62.8 (2015): 2494-2501. (Year: 2015).*

* cited by examiner

*Primary Examiner* — Benjamin P Geib
(74) *Attorney, Agent, or Firm* — IP & T Group LLP

(57) ABSTRACT

A neuromorphic device is provided. The neuromorphic device may include a plurality of pre-synaptic neuron circuits, a plurality of post-synaptic neuron circuits, and a plurality of synapses. Each of the synapses may be electrically connected to the plurality of pre-synaptic neuron circuits and a corresponding one of the plurality of post-synaptic neuron circuits. Each of the plurality of synapses may include a plurality of synapse cells. Each of the synapse cells may be electrically connected to a corresponding one of the plurality of pre-synaptic neuron circuits through a corresponding one of a plurality of row lines, respectively. Each of the synapse cells may be electrically connected to the corresponding one of the plurality of post-synaptic neuron circuits through one common column line.

15 Claims, 16 Drawing Sheets

NEUROMORPHIC DEVICE INCLUDING A SYNAPSE HAVING A PLURALITY OF SYNAPSE CELLS

CROSS-REFERENCE TO RELATED APPLICATIONS

The present application claims priority to Korean Patent Application No. 10-2017-0015560, filed on Feb. 3, 2017, which is herein incorporated by reference in its entirety.

BACKGROUND

1. Field

Various embodiments of the present invention relate to neuromorphic devices, and more particularly, to neuromorphic devices including a synapse having a plurality of synapse cells.

2. Description of the Related Art

Recently, much attention has been paid to devices in the field of neuromorphic technology, which use chips to mimic the human brain. A neuromorphic device based on the neuromorphic technology includes a plurality of pre-synaptic neurons, a plurality of post-synaptic neurons, and a plurality of synapses. The neuromorphic device outputs pulses or spikes having various levels, amplitudes, and/or times, according to a learning state of the neuromorphic device.

SUMMARY

Exemplary embodiments of the present invention provide a neuromorphic device including a synapse having a plurality of synapse cells.

Exemplary embodiments of the present invention provide a neuromorphic device including a synapse including a plurality of synapse cells, each of which has different current driving efficiencies.

Exemplary embodiments of the present invention provide a neuromorphic device with a plurality of synapse being used as one synapse.

Technical objects to be achieved by the present invention are not limited to the aforementioned objects, and those skilled in the art to which the present invention pertains may evidently understand other technical objects from the following description.

In an embodiment of the present disclosure, a neuromorphic device may include a plurality of pre-synaptic neuron circuits, a plurality of post-synaptic neuron circuits, and a plurality of synapses.

Each of the synapses may be electrically connected to the plurality of pre-synaptic neuron circuits and a corresponding one of the plurality of post-synaptic neuron circuits.

Each of the plurality of synapses may include a plurality of synapse cells.

Each of the synapse cells may be electrically connected to a corresponding one of the plurality of pre-synaptic neuron circuits through a corresponding one of a plurality of row lines, respectively.

Each of the synapse cells may be electrically connected to the corresponding one of the plurality of post-synaptic neuron circuits through one common column line.

Each of the plurality of synapse cells may include one or more transistors and one memristors.

The transistors of the plurality of synapse cells included in one of the synapses may have different current driving efficiencies.

The transistor in each synapse cell may be electrically connected to the corresponding one of the plurality of row lines.

A drain electrode of the transistor in each synapse cell may be electrically connected to the corresponding one of the plurality of row lines.

A source electrode of the transistor in each synapse cell may be electrically connected to the memristor.

The memristor in each synapse cell may be electrically connected to the corresponding one of the plurality of row lines and a drain electrode of the transistor in each synapse cell.

A source electrode of the transistor in each synapse cell may be electrically connected to the common column line.

A gate electrode of the transistor in each synapse cell may be electrically connected to the corresponding one of the plurality of row lines.

A drain electrode of the transistor in each synapse cell may be electrically connected to a reference voltage node.

The plurality of synapse cells may include different numbers of transistors from each other, respectively.

The transistor of each of the synapse cell may be electrically connected in parallel to each other.

A gate electrode of the transistor of each of the synapse cell may be commonly electrically connected to each other.

A gate electrode of the transistor of each of the synapse cell may be commonly electrically connected to the corresponding one of the plurality of row lines.

A drain electrode of the transistor of each of the synapse cell may be commonly electrically connected to a reference voltage node.

The plurality of synapse cells may include a transistor and a memristor, respectively.

The memristors of the synapse cells may have different fixed resistance values.

In an embodiment of the present disclosure, a neuromorphic device may include a plurality of pre-synaptic neuron circuits, a plurality of post-synaptic neuron circuits, and a plurality of synapses.

Each of the synapses may be electrically connected to the pre-synaptic neuron circuits and a corresponding one of the post-synaptic neuron circuits.

The plurality of synapses may include a plurality of synapse cells having different current driving efficiencies, respectively.

The plurality of synapse cells may include a transistor and a memristor.

The transistors of the synapse cells may have different channel sizes.

The plurality of synapse cells may include different numbers of the transistors and one memristor, respectively.

The plurality of synapse cells may include a transistor and a memristor, respectively.

The memristors of the synapse cells may have different fixed resistance values.

The plurality of synapse cells may be independently electrically connected to the pre-synaptic neuron circuits through a plurality of row lines.

The plurality of synapse cells may be commonly electrically connected to the corresponding one of the post-synaptic neuron circuits through common column line, respectively.

DETAILED DESCRIPTION

Various embodiments will be described below in more detail with reference to the accompanying drawings. Embodiments of the present disclosure may, however, have different forms and should not be construed as limited to the embodiments set forth herein. Rather, these embodiments are provided so that this disclosure will be thorough and complete, and will fully convey the scope of the claims to those skilled in the art.

Figure 1:
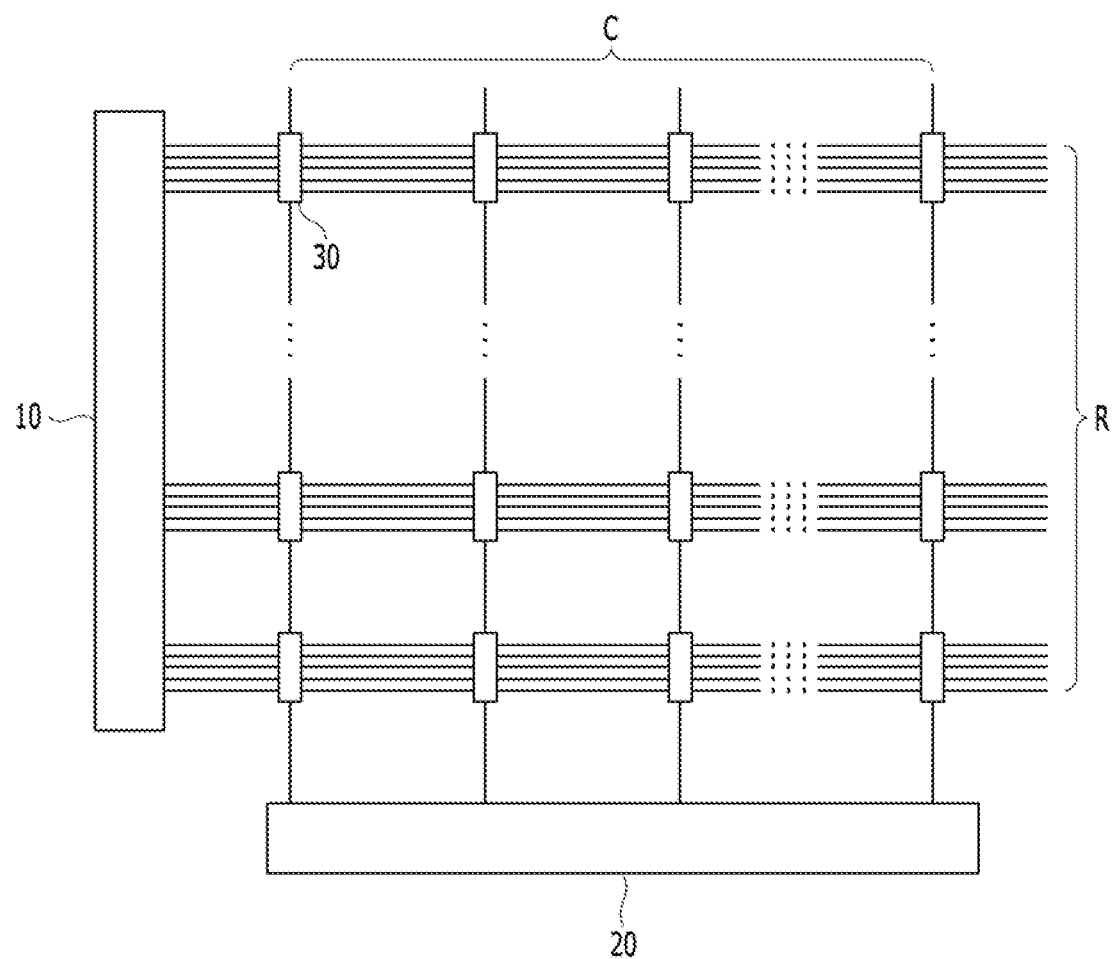
FIG. 1 is a diagram schematically illustrating a neuromorphic device in accordance with an embodiment of the present invention.

FIG. 1 is a diagram schematically illustrating a neuromorphic device in accordance with an embodiment of the present invention. Referring to FIG. 1, the neuromorphic device in accordance with the embodiment of the present invention may include a plurality of pre-synaptic neuron circuits 10, a plurality of post-synaptic neuron circuits 20, and a plurality of synapses 30.

The plurality of synapses 30 may be disposed at intersections of row lines R and column lines C, each of the row lines R extending in a row direction from a corresponding one of the pre-synaptic neuron circuits 10 and, each of the column lines CL extending in a column direction from a corresponding one of the post-synaptic neuron circuits 20. Each of the synapses 30 may be electrically connected with the plurality of the row lines R and one of the plurality of the column lines C.

The pre-synaptic neuron circuits 10 may transmit electrical pulses to the synapses 30 through the row lines R in a learning mode, reset mode, or read mode.

The post-synaptic neuron circuits 20 may transmit electrical pulses to the synapses 30 through the column lines C in the learning mode or a reset mode, and may receive electrical pulses from the synapses 30 through the column lines C in the read mode.

Each of the synapses 30 may include a variable resistor having multiple resistance levels.

Figure 2:
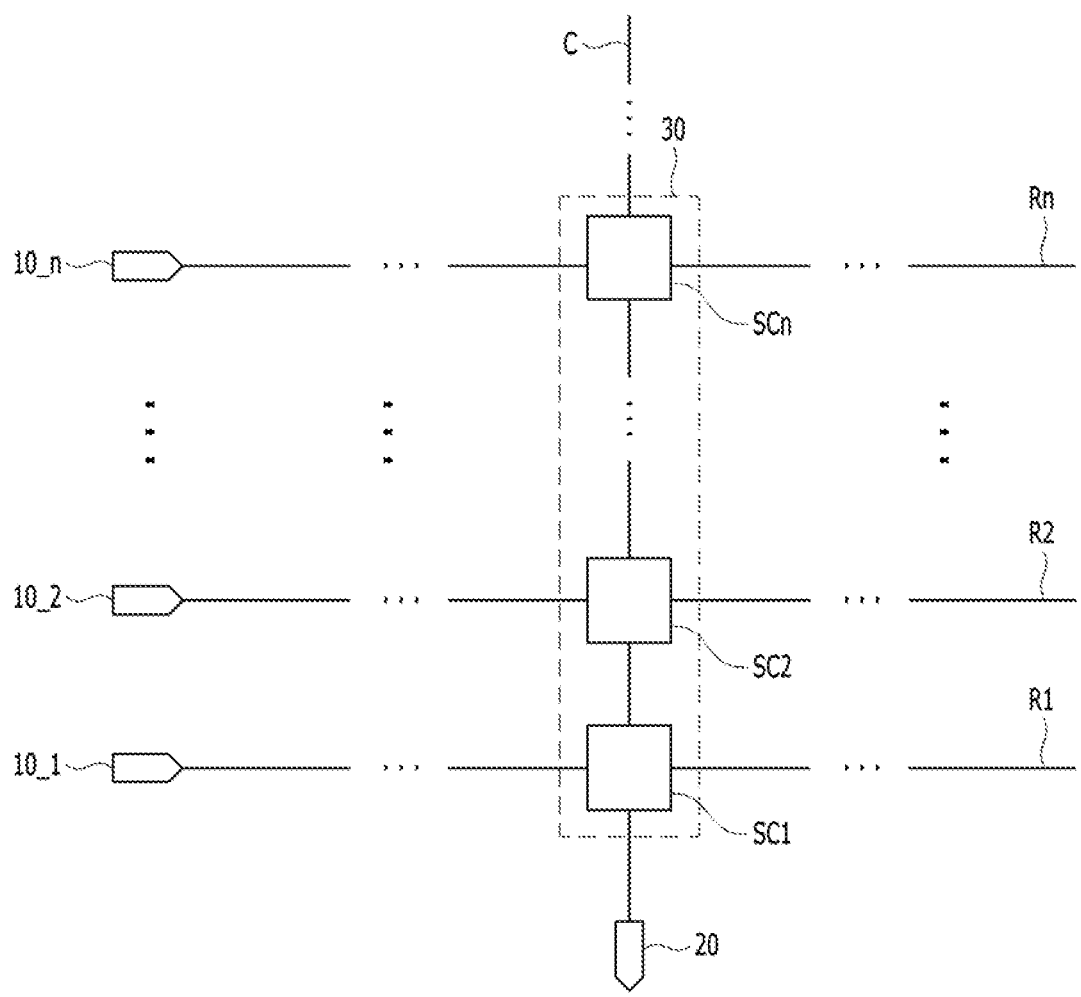
FIG. 2 is a schematic diagram illustrating a synapse of a neuromorphic device in accordance with an embodiment of the present invention in detail.

FIG. 2 is a schematic diagram illustrating a synapse 30 of a neuromorphic device in accordance with an embodiment of the present invention in detail.

Referring to FIG. 2, a synapse 30 of a neuromorphic device in accordance with an embodiment of the present invention may include a plurality of synapse cells SC1 to SCn. The plurality of the synapse cells SC1 to SCn may be electrically connected with a plurality of pre-synaptic neuron circuits 10_1 to 10_$n$ through a plurality of row lines R1 to Rn, respectively. The plurality of synapse cells SC1 to SCn may be commonly connected with one of the column lines C. That is, the plurality of synapse cells SC1 to SCn may form one synapse 30.

Each of the synapse cells SC1 to SCn may store different amounts of information. For example, current amounts output from a common post-synaptic neuron circuit 20 through each of the synapse cells SC1 to SCn may have multiple levels. Accordingly, various information of the synapse 30 may be provided.

In a learning mode or a writing mode, the pre-synaptic neuron circuits 10_1 to 10_$n$ may independently train the corresponding synapse cells SC1 to SCn and/or write data therein, respectively.

In a reading mode, the data stored in the synapse cells SC1 to SCn may be output to the common post-synaptic neuron circuit 20 at the same time. That is, the currents from each of the synapse cells SC1 to SCn may be summed and output to the common post-synaptic neuron circuit 20.

The common post-synaptic neuron circuit 20 can detect and/or integrate total amount of the currents provided from each of the synapse cells SC1 to SCn and select and output an information value.

FIGS. 3A to 3E are diagrams schematically illustrating synapses 30$a$ to 30$n$ including a plurality of synapse cells SC1 to SCn in accordance with embodiments of the present invention.

Referring to FIGS. 3A to 3E, each of the synapses 30$a$ to 30$n$ may include a plurality of synapse cells SC1 to SCn. The synapse cells SC1 to SCn may include transistors T1 to Tn and memristors M1 to Mn.

The transistors T1 to Tn may have various channel sizes and different current driving efficiencies. Specifically, the first transistor T1 may have a first channel size and a first current driving efficiency. The second transistor T2 may have a second channel size twice the first channel size and a second current driving efficiency twice the first current driving efficiency of the first transistor T1. The third transistor T3 may have a third channel size twice the second channel size and a third current driving efficiency twice the second current driving efficiency of the second transistor T2. The fourth transistor T4 may have a fourth channel size twice the third channel size and a fourth current driving efficiency twice the third current driving efficiency of the third transistor T3. The fifth transistor T5 may have a fifth channel size twice the fourth channel size and a fifth current driving efficiency twice the fourth current driving efficiency of the fourth transistor T4. Accordingly, the nth transistor Tn may have an nth channel size twice the n−1th channel size and an nth current driving efficiency twice the n−1th current driving efficiency of the n−1th transistor Tn−1. That is, when the first transistor T1 has the first channel size W, the second transistor T2 may have the second channel size 2W, the third transistor T3 may have the third channel size 4W, the fourth transistor T4 may have the fourth channel size 8W, the fifth transistor T5 may have the fifth channel size 16W, and the nth transistor Tn may have the nth channel size $(2^{n-1})$W. The channel size may be defined a ratio of a channel width to a channel length. That is, the channel size may be defined as the channel width divided by the channel length.

The Memristors M1 to Mn may have fixed resistance values or variable resistance values. In some embodiments of the present invention, each of the memristors M1 to Mn may include a capacitor. In some embodiments of the present invention, each of the transistors T1 to Tn may have the same channel size and the same current driving efficiency, and each of the memristors M1 to Mn may have different fixed resistance values. Accordingly, the synapse cells SC1 to SCn can output different current values. Furthermore, in some embodiments of the present invention, the memristors M1 to Mn may include a plurality of fixed resistors being connected in parallel with each other. Accordingly, each of the memristors M1 to Mn may have different total resistance values, and the synapse cells SC1 to SCn can output different current values.

The synapse cells SC1 to SCn may be written independently and read out at the same time. For example, the synapse cells SC1 to SCn may be respectively connected with the corresponding pre-synaptic neuron circuits 10_1 to 10_n, and data can be independently written in the synapse cells SC1 to SCn. Specifically, data to be written and stored in the synapses 30 and 30a to 30n may be predetermined using software, and the predetermined data may be independently written and stored in each of the synapse cells SC1 to SCn of the synapses 30 and 30a to 30n. Accordingly, the synapse cells SC1 to SCn may not go through a learning process. Furthermore, the synapse cells SC1 to SCn may be turned on at the same time and may output the data to the common column line C. Specifically, each of the current values output from the respective synapse cells SC1 to SCn may be summed and output to the common post-synaptic neuron circuit 20.

Figure 3A:
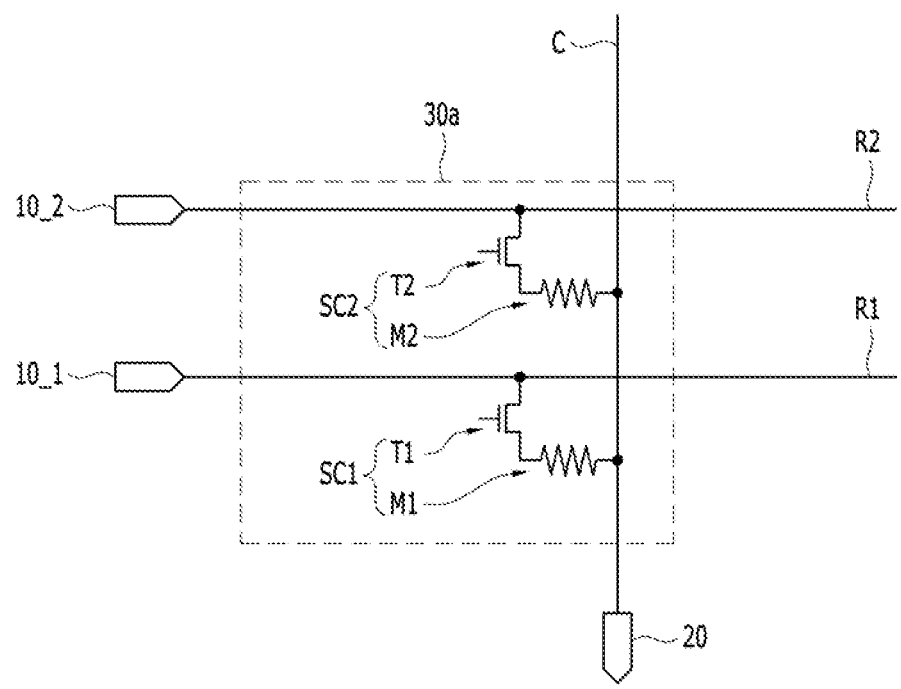
FIGS. 3A to 3E are diagrams schematically illustrating synapses including a plurality of synapse cells in accordance with embodiments of the present invention.

Referring to FIG. 3A, the synapse 30a in accordance with the embodiment of the present invention may have four levels of information. Specifically, as the first transistor T1 and the second transistor T2 are turned on and/or turned off, current amounts being able to be output from the first synapse cell SC1 and the second synapse cell SC2 may have four levels. Table 1 shows the current levels in accordance with the combination of on/off states of the first transistor T1 and the second transistor T2.

TABLE 1

| Current Levels | T1 | T2 | Channel Sizes |
|---|---|---|---|
| 0 | Off | Off | 0 |
| 1 | On | Off | W |
| 2 | Off | On | 2 W |
| 3 | On | On | 3 W |

Figure 3B:
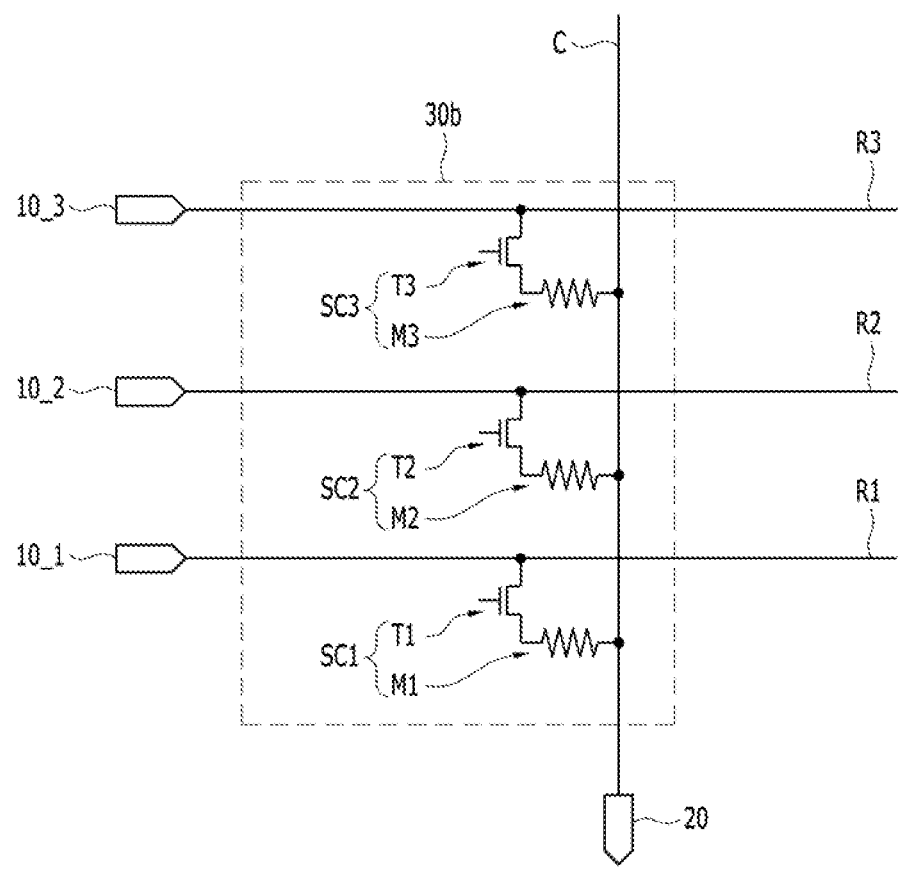

Referring to FIG. 3B, the synapse 30b in accordance with the embodiment of the present invention may have eight levels of information. Specifically, as the first transistor T1, the second transistor T2, and the third transistor T3 are turned on and/or turned off, current amounts being able to be output from the first to third synapse cells SC1 to SC3 may have eight levels. Table 2 shows the current levels in accordance with the combination of on/off states of the first to third transistors T1 to T3. It may be understood with reference to Table 1 that when the third transistor is turned-on, the current amounts may have the 0th current level to the third current level

TABLE 2

| Current Levels | T1 | T2 | T3 | Channel Sizes |
|---|---|---|---|---|
| 4 | Off | Off | On | 4 W |
| 5 | On | Off | On | 5 W |
| 6 | Off | On | On | 6 W |
| 7 | On | On | On | 7 W |

Figure 3C:
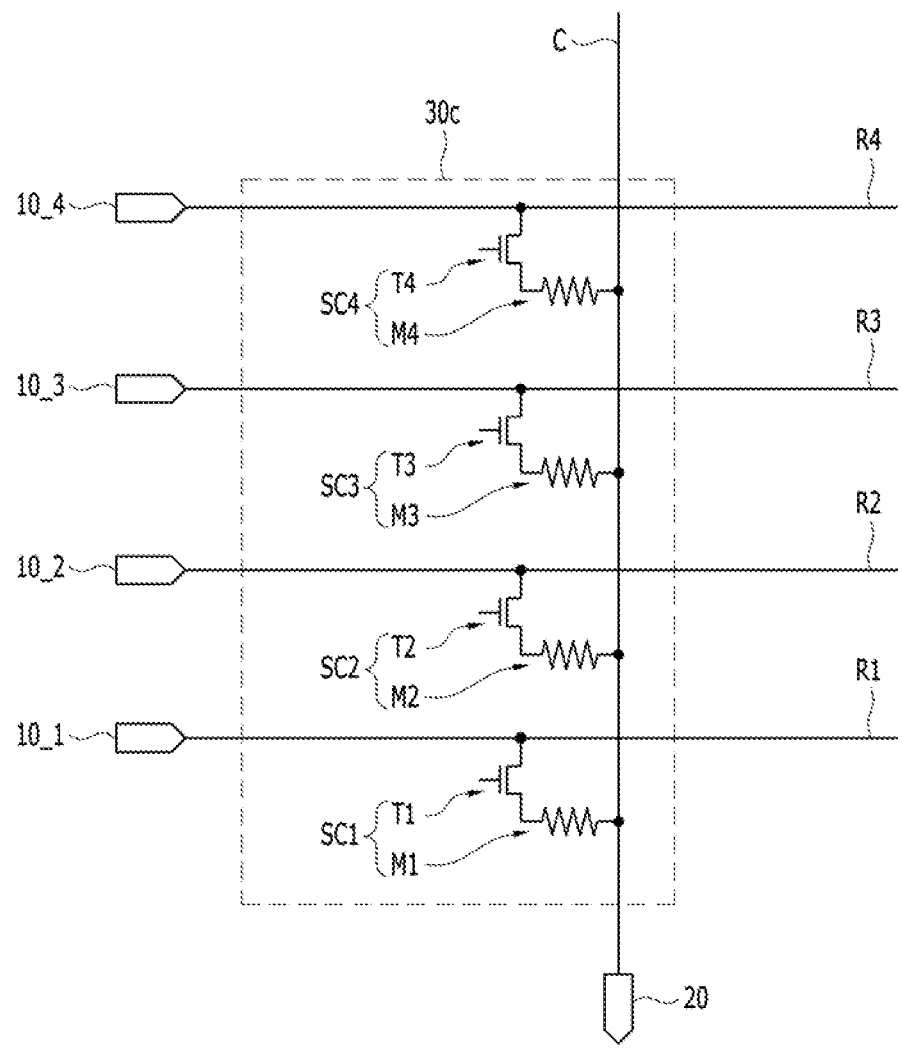
Figure 3D:
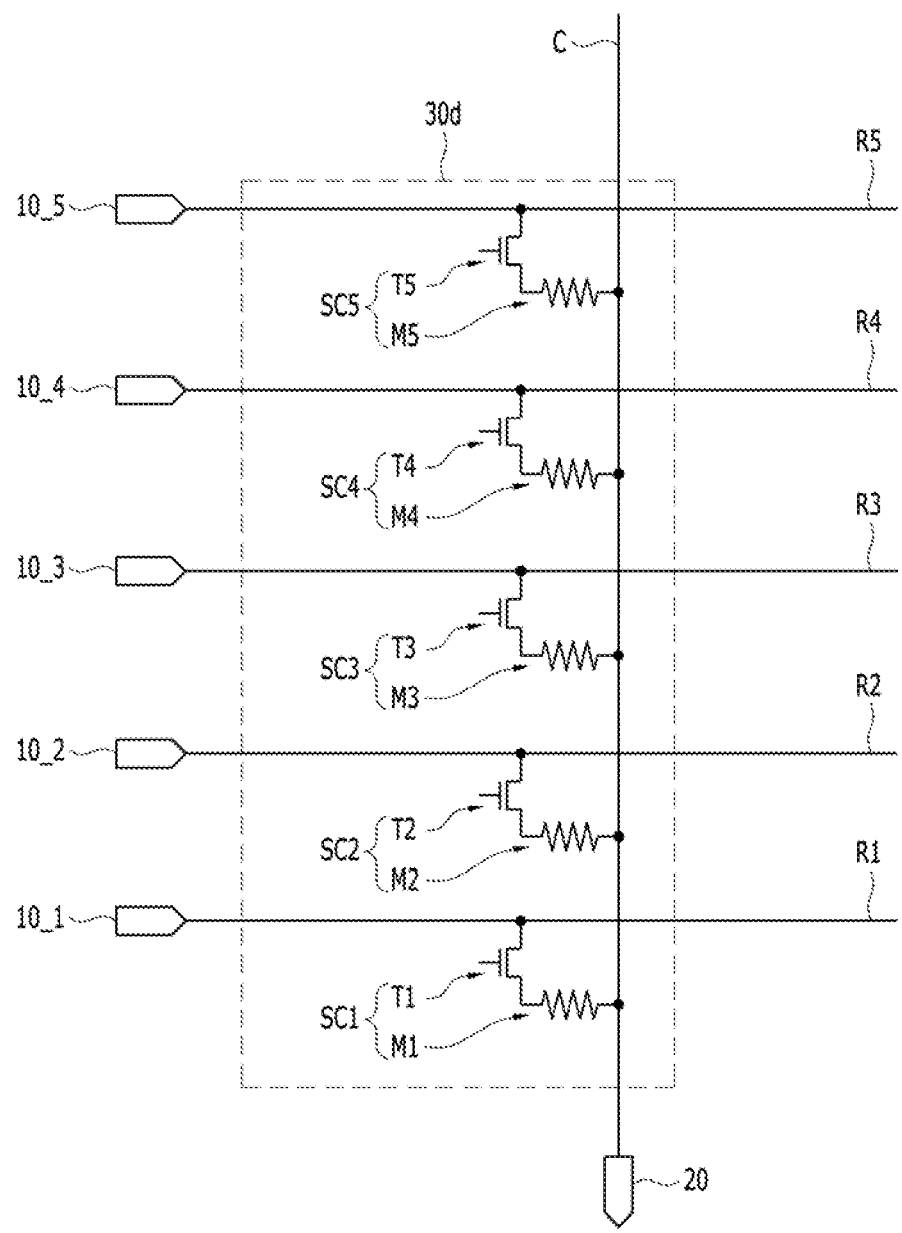
Figure 3E:
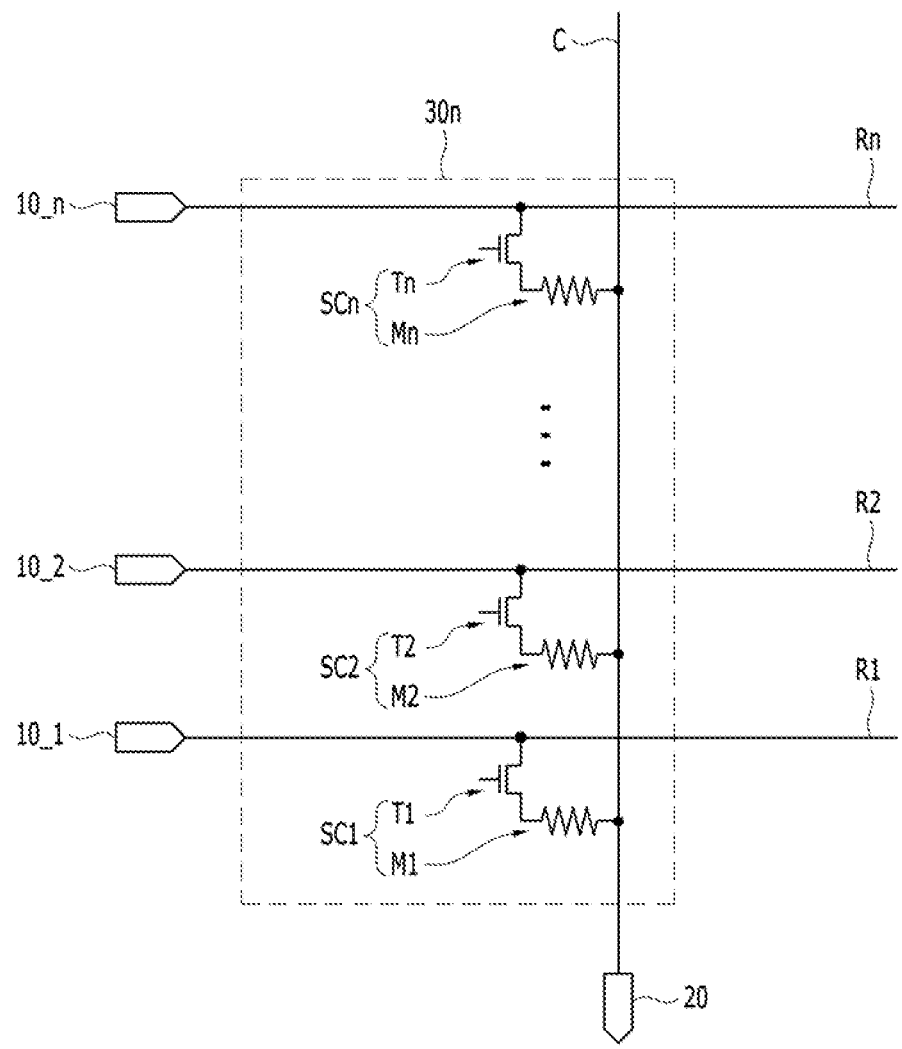

Likewise, referring to FIGS. 3C to 3E, the synapses 30c to 30n in accordance with the various embodiments of the present invention can have $2^n$ levels of information depending on the number of the transistors Tn (n is a positive integer). Specifically, the synapse 30a including two synapse cells SC1 and SC2, each having their respective transistors T1 and T2 may have four information levels ($2^2=4$), the synapse 30b including three synapse cells SC1 to SC3, each having their respective transistors T1 to T3 may have eight information levels ($2^3=8$), the synapse 30c including four synapse cells SC1 to SC4, each having their respective transistors T1 to T4 may have sixteen information levels ($2^4=16$), the synapse 30d including five synapse cells SC1 to SC5, each having their respective transistors T1 to T5 may have thirty-two information levels ($2^5=32$), and the synapse 30n including n synapse cells SC1 to SCn, each having their respective transistors T1 to Tn may have $2^{(n)}$ information levels. Table 3 shows the current levels in accordance with the combination of on/off states of the first to fourth transistors T1 to T4. The current levels in accordance with the off state of the fourth transistor T4 are omitted from Table 3, since they may be obtained with reference to Tables 1 and 2.

TABLE 3

| Current Levels | T1 (1 W) | T2 (2 W) | T3 (4 W) | T4 (8 W) | Channel Sizes |
|---|---|---|---|---|---|
| 8 | Off | Off | Off | On | 8 W |
| 9 | On | Off | Off | On | 9 W |
| 10 | Off | On | Off | On | 10 W |
| 11 | On | On | Off | On | 11 W |
| 12 | Off | Off | On | On | 12 W |
| 13 | On | Off | On | On | 13 W |
| 14 | Off | On | On | On | 14 W |
| 15 | On | On | On | On | 15 W |

Exemplary descriptions of the current levels concerning the synapse cells SC1 to SCn having more than five transistors T1 to Tn are omitted.

FIGS. 4 to 7 are diagrams schematically illustrating synapses of neuromorphic devices having a plurality of synapse cells in accordance with embodiments of the present invention.

Figure 4:
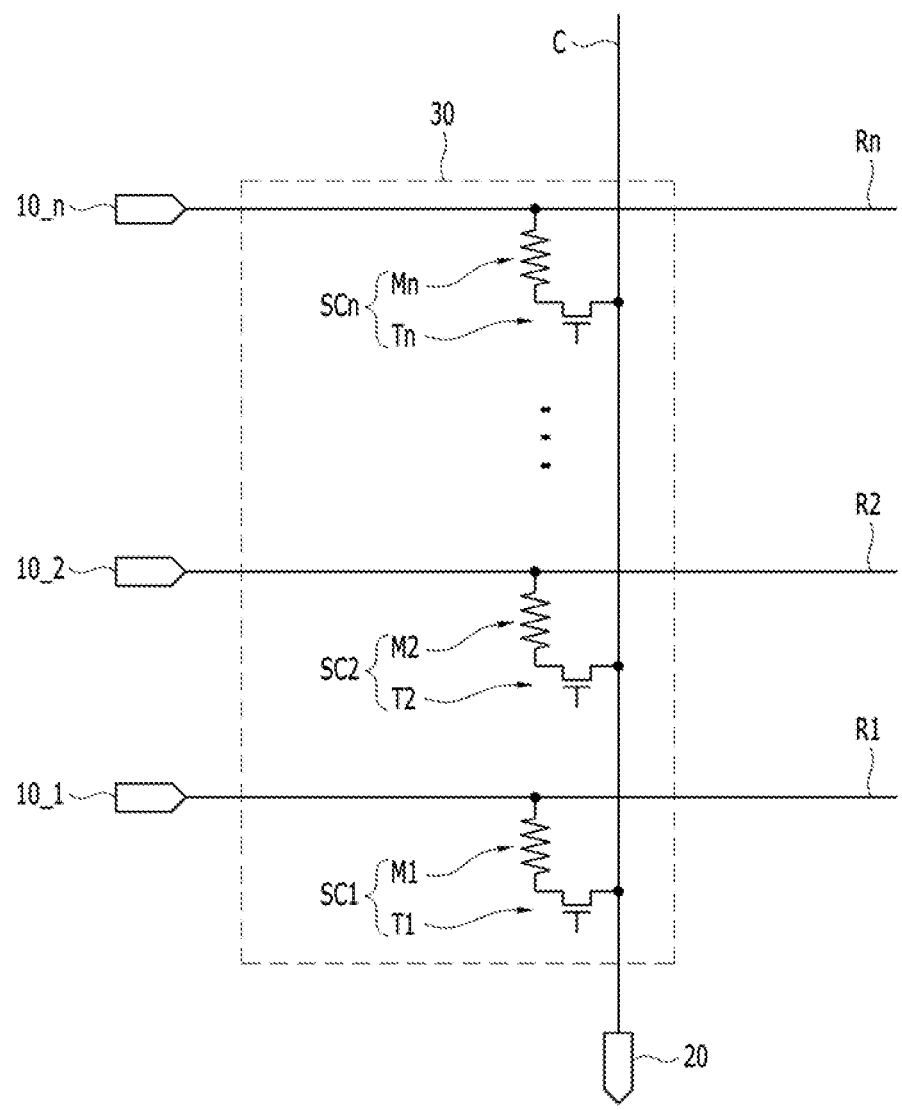
FIGS. 4 to 7 are diagrams schematically illustrating synapses of neuromorphic devices having a plurality of synapse cells in accordance with embodiments of the present invention.

Referring to FIG. 4, the synapse 30 of the neuromorphic device may include the memristors M1 to Mn connected with the row lines R1 to Rn and the transistors T1 to Tn connected with the common column line C. When comparing with the synapses 30a to 30n shown in FIGS. 3A to 3E, it will be found that the locations for placement of the transistors T1 to Tn and the memristors M1 to Mn are interchanged with each other. Accordingly, the technical features of the present invention applied to the synapses 30a to 30n shown in FIGS. 3A to 3E can be applied to the synapse 30 shown in FIG. 4.

Figure 5:
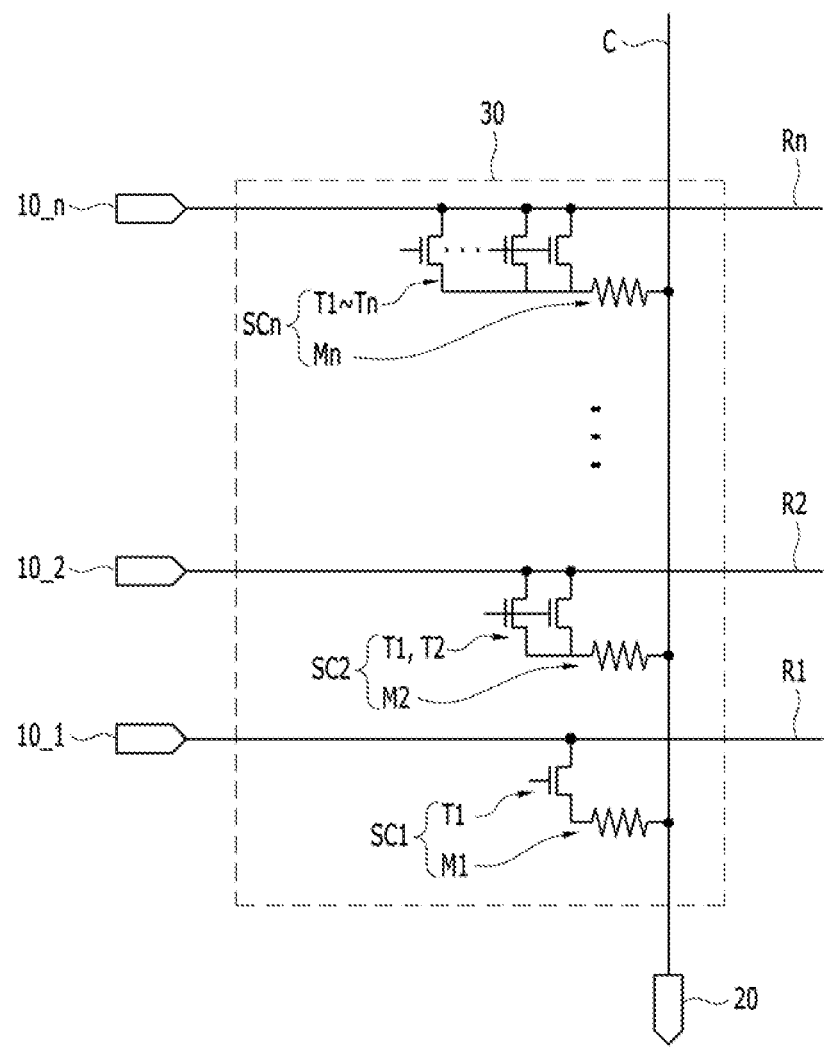

Referring to FIG. 5, the synapse 30 in accordance with the embodiment of the present invention may include a plurality of synapse cells SC1 to SCn. Each of the synapse cells SC1 to SCn may include one or more of transistors T1 to Tn and one of the memristors M1 to Mn. For example, the first synapse cell SC1 may include one transistor T1 and one memristor M1, the second synapse cell SC2 may include two transistors T1 and T2, and one memristor M2, and nth synapse cell SCn may include n transistors T1 to Tn and one memristor Mn. In the embodiment of the present invention, the transistors T1 to Tn may have the same channel size and the same current driving efficiency. Accordingly, the synapse cells SC1 to SCn may transfer currents having various current levels depending on the number of the transistors T1 to Tn. The transistors T1 to Tn may be connected in parallel with one another. The gate electrodes of the transistors T1 to Tn of each of the synapse cells SC1 to SCn may be electrically connected with each other. That is, the transistors T1 to Tn of each of the synapse cells SC1 to SCn may be turned-on and turned-off at the same time.

Figure 6:
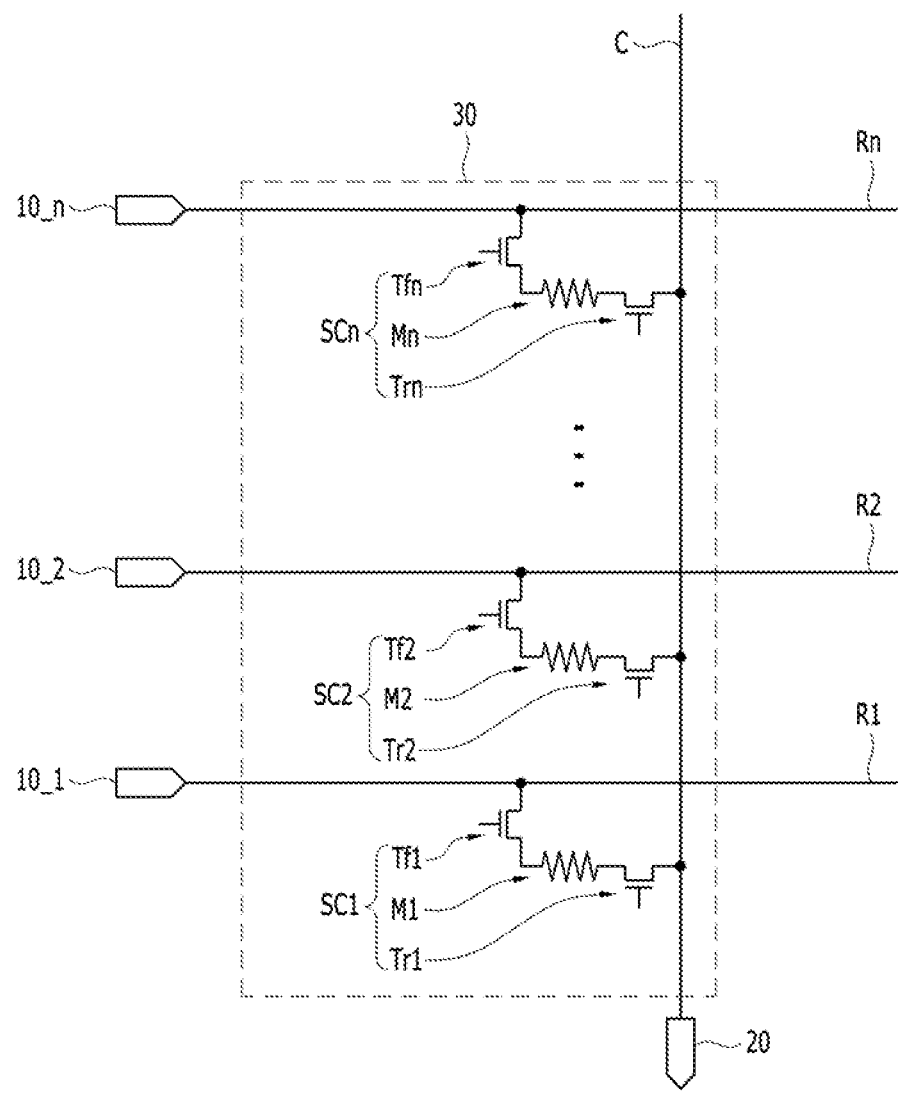

Referring to FIG. 6, a synapse 30 in accordance with an embodiment of the present invention may include a plurality of synapse cells SC1 to SCn. Each of the synapse cells SC1 to SCn may include one of front transistors Tf1 to Tfn, one of memristors M1 to Mn, and one of rear transistors Tr1 to Trn. Each drain electrode of the front transistors Tf1 to Tfn may be connected with a corresponding circuit of pre-synaptic neuron circuits 10_1 to 10_n through a corresponding line of row lines R1 to Rn, respectively, and source electrodes of the rear transistors Tr1 to Trn may be electrically connected with a common post-synaptic neuron circuit 20 through a common column line C. Referring to FIGS. 3A to 3E, the front transistors Tf1 to Tfn may have various channel sizes and different current driving efficiencies, and the rear transistors Tr1 to Trn may have various channel sizes and different current driving efficiencies. The gate electrodes of the front transistors Tf1 to Tfn and the rear transistors Tr1 to Trn in each of the synapse cells SC1 to SCn may be commonly connected with each other. Accordingly, the front transistors Tf1 to Tfn and the rear transistors Tr1 to Trn of each of the synapse cells SC1 to SCn may be turned-on and turned-off at the same time.

Figure 7:
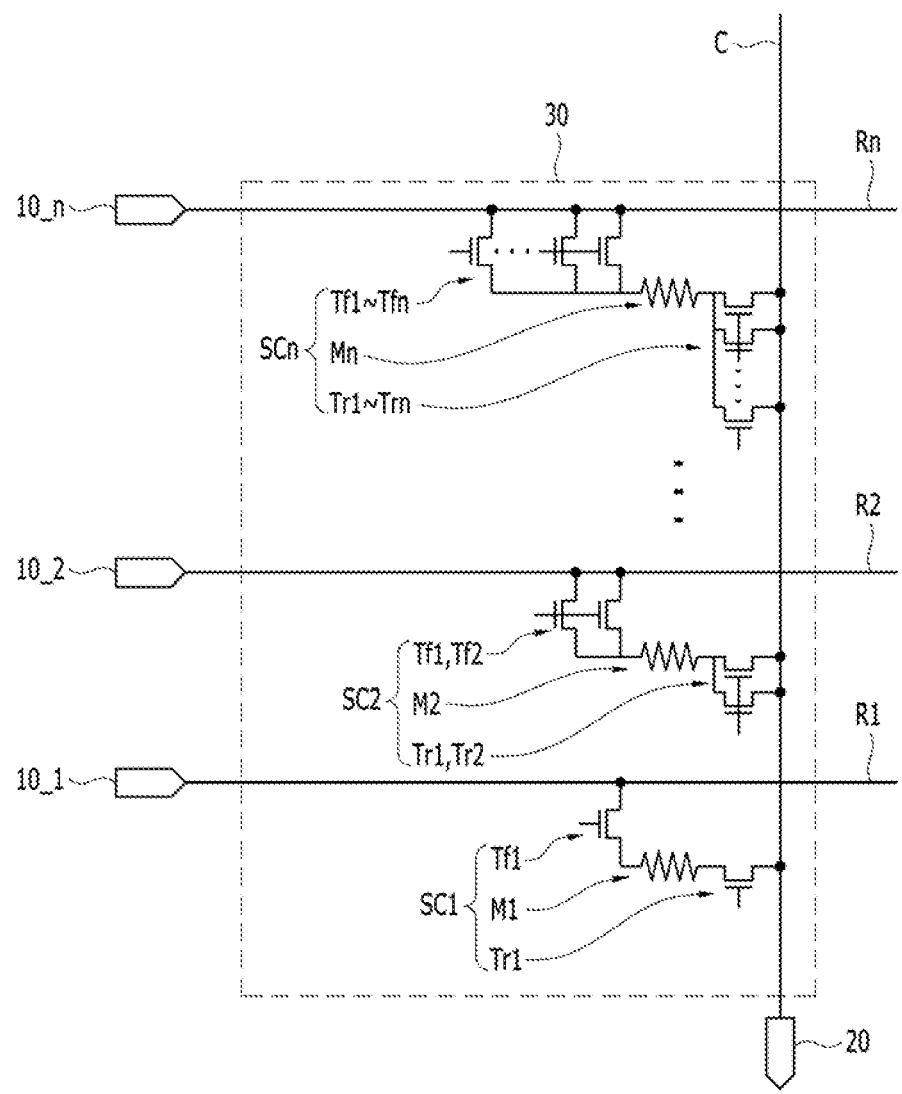

Referring to FIG. 7, the synapse 30 in accordance with an embodiment of the present invention may include a plurality of synapse cells SC1 to SCn. Each of the synapse cells SC1 to SCn may include one or more of front transistors Tf1 to Tfn, one of memristors M1 to Mn, and one or more of rear transistors Tr1 to Trn. In the present embodiment, each of the synapse cells may have the same number of the front transistors and the rear transistors. The technical concepts of the invention can be specifically understood with reference to FIGS. 5 and 6.

Figure 8:
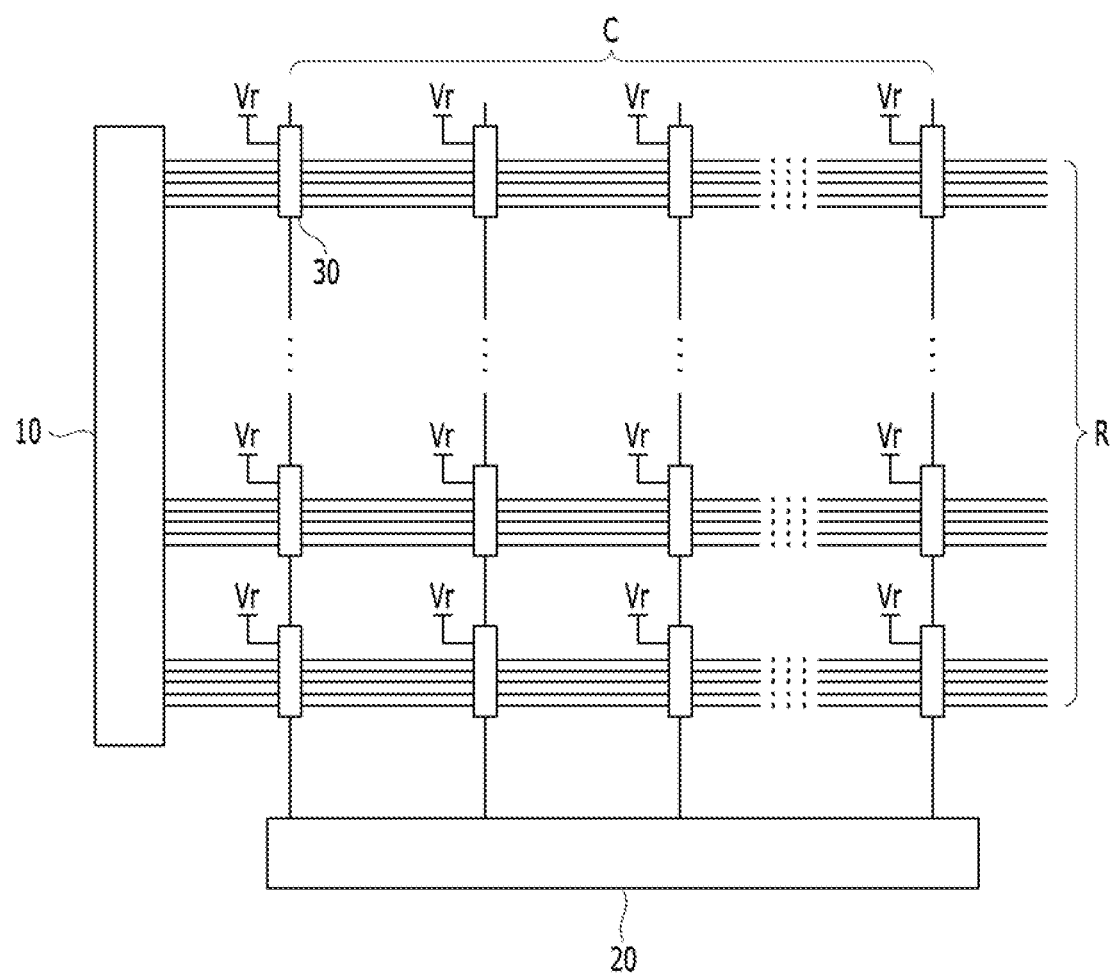
FIG. 8 is a diagram schematically illustrating a neuromorphic device in accordance with an embodiment of the present invention.

FIG. 8 is a diagram schematically illustrating a neuromorphic device in accordance with an embodiment of the present invention. Referring to FIG. 8, the neuromorphic device, comparing to the neuromorphic device shown in FIG. 1, may further include a reference voltage node Vr electrically connected with each of the synapses 30. The reference voltage node Vr may include a Vdd (device power node) or a VSS (ground node).

Figure 9:
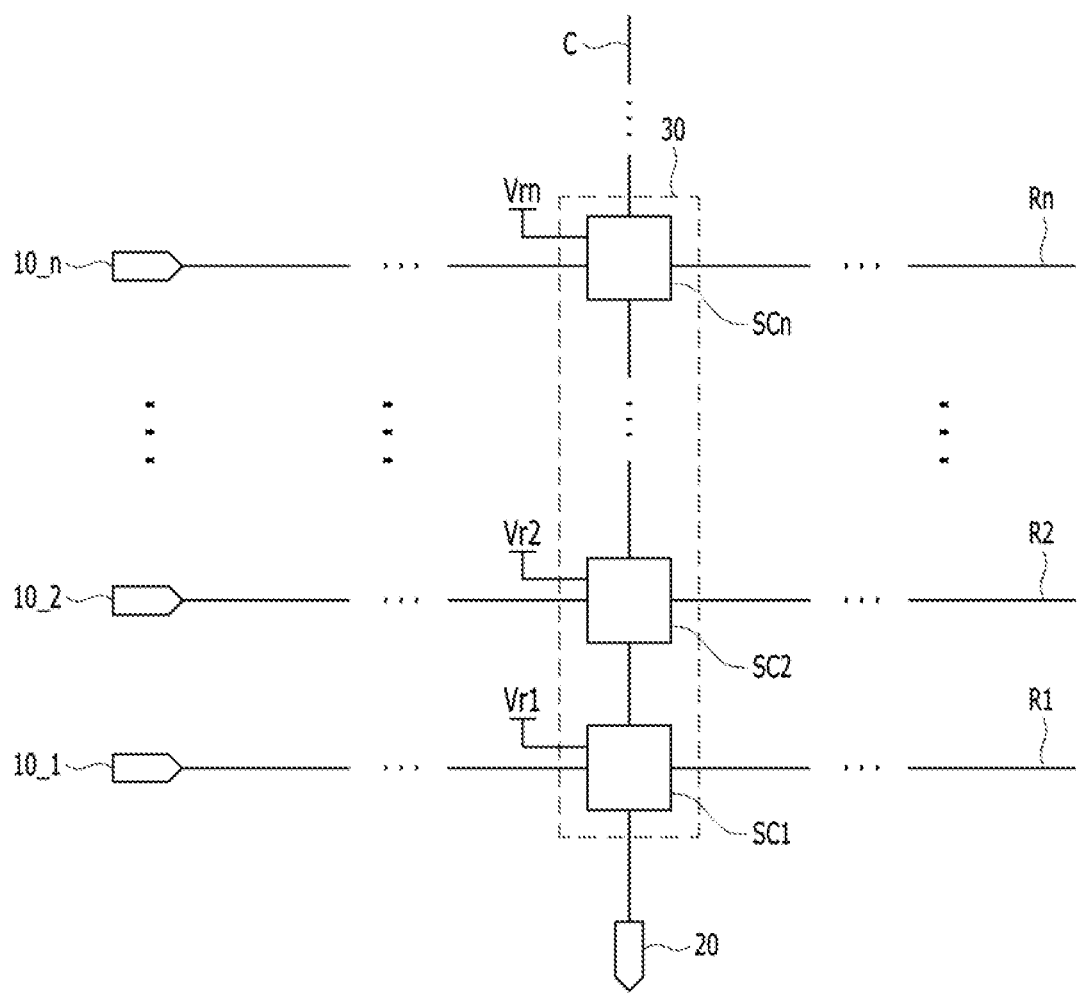
FIG. 9 is a diagram illustrating a synapse of a neuromorphic device in accordance with an embodiment of the present invention.

FIG. 9 is a diagram illustrating a synapse 30 of a neuromorphic device in accordance with an embodiment of the present invention. Referring to FIG. 9, the synapse 30 of the neuromorphic device, comparing the synapse 30 shown in FIG. 2, may further include unit reference voltage nodes Vr1 to Vrn electrically connected with each of the synapse cells SC1 to SCn.

Figure 10:
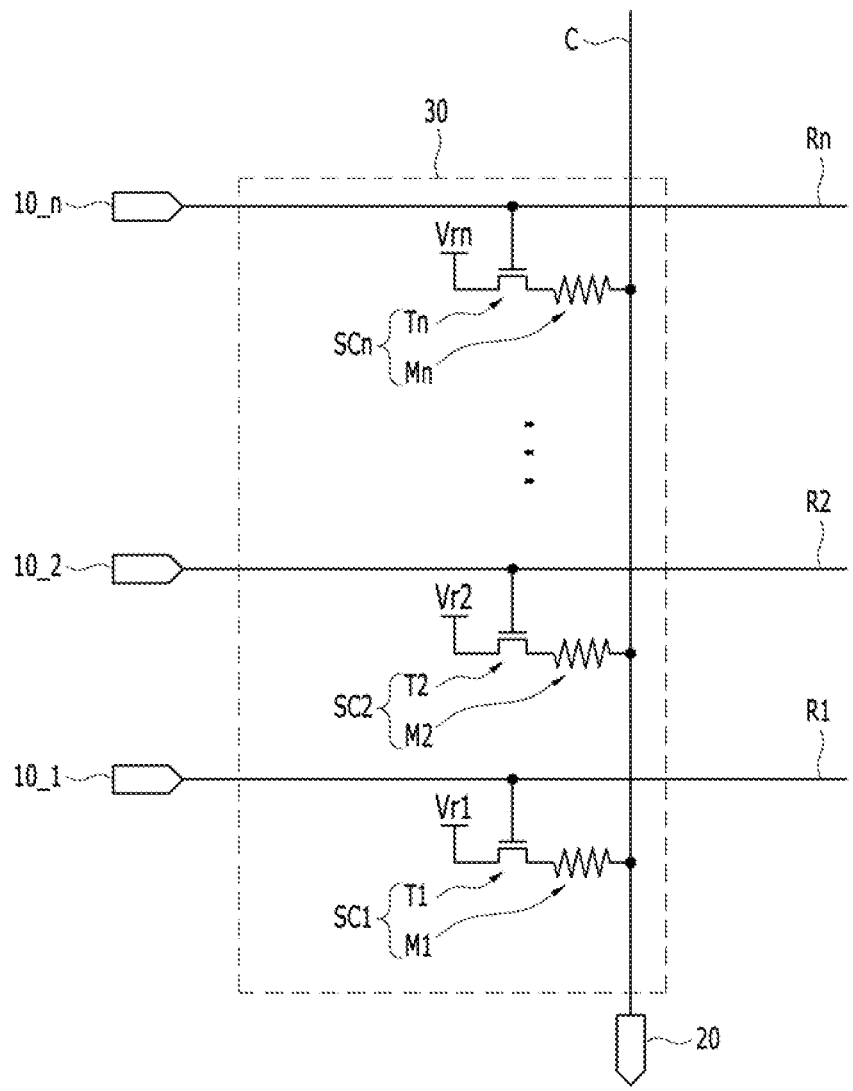
FIGS. 10 and 11 are diagrams schematically illustrating a plurality of synapse cells of synapses of neuromorphic devices in accordance with embodiments of the present invention.
Figure 11:
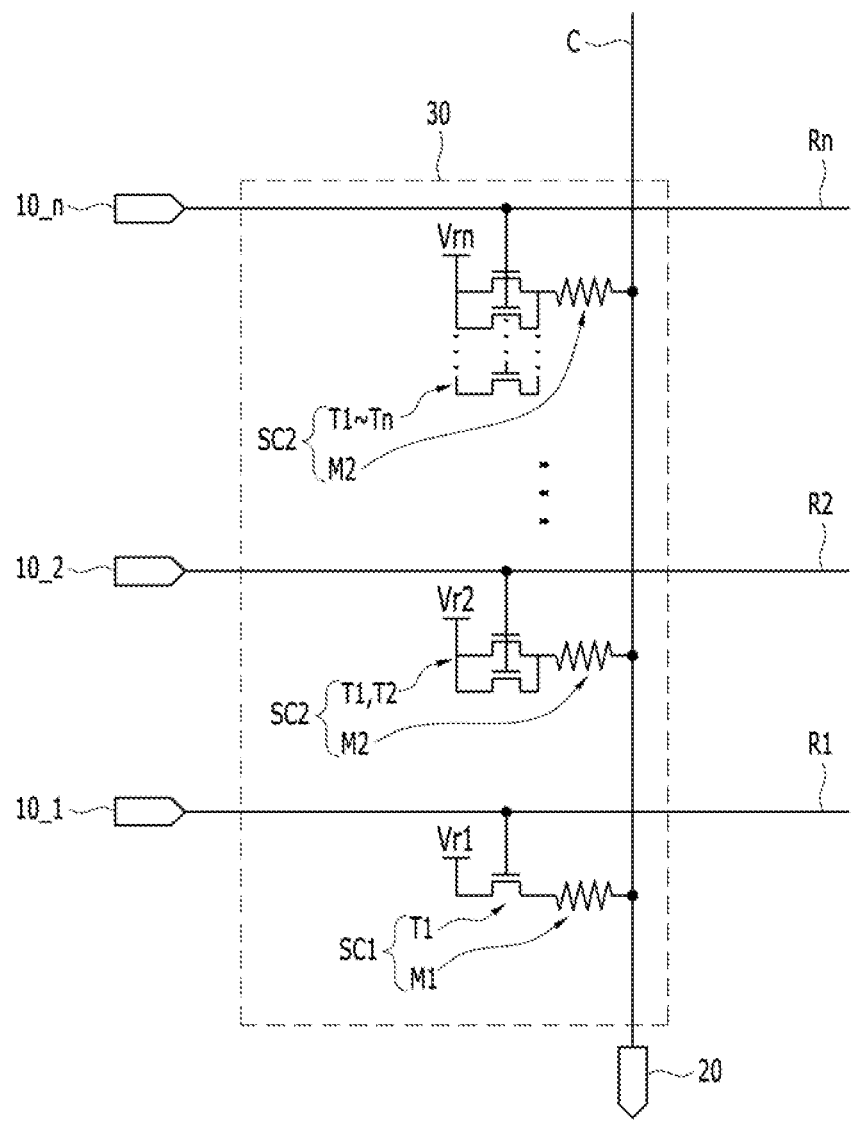

FIGS. 10 and 11 are diagrams schematically illustrating synapse cells SC1 to SCn of synapses 30 of neuromorphic devices in accordance with embodiments of the present invention. Referring to FIG. 10, the synapse cells SC1 to SCn of the synapse 30 of the neuromorphic device may include transistors T1 to Tn and memristors M1 to Mn. Gate electrodes of the transistors T1 to Tn may be electrically connected with pre-synaptic circuits 10_1 to 10_n through row lines R1 to Rn. Drain electrodes of the transistors T1 to Tn may be electrically connected with the reference voltage nodes Vr1 to Vrn, respectively. Source electrodes of the transistors T1 to Tn may be electrically connected with first nodes of the memristors M1 to Mn, respectively. Second nodes of the memristors M1 to Mn may be electrically connected with a common post-synaptic neuron circuit 20 through a common column line C. Accordingly, the currents may be supplied from the reference voltage nodes Vr1 to Vrn to the memristors M1 to Mn depending on on/off states of the transistors T1 to Tn, or the currents may be drained from the memristors M1 to Mn to the reference voltage nodes Vr1 to Vrn depending on the on/off states of the transistors T1 to Tn. In some embodiments of the present invention, the locations for placement of the transistors T1 to Tn and the memristors M1 to Mn can be interchanged with each other. Further referring to FIGS. 3A to 3E, the transistors T1 to Tn may have various channel sizes and different current driving efficiencies. Further referring to FIG. 4, the locations for placement of the transistors T1 to Tn and the memristors M1 to Mn can be interchanged with each other.

Referring to FIG. 11, each of synapse cells SC1 to SCn of a synapse 30 of a neuromorphic device in accordance with an embodiment of the present invention may include one or more of transistors T1 to Tn and one of memristors M1 to Mn, respectively. For example, the first synapse cell SC1 may include one transistor T1 and one memristor M1, the second synapse SC2 may include two transistors T1 and T2 and one memristor M2, and nth synapse cell SCn may include n transistors T1 to Tn and one memristor Mn.

An embodiment of the present invention, the transistors T1 to Tn may include the same channel size and the same current driving efficiency. Accordingly, the synapse cells SC1 to SCn may transmit the currents having various current levels depending on the number of the transistors T1 to Tn. The transistors T1 to Tn may be connected in parallel with each other. The gate electrodes of the transistors T1 to Tn of each of the synapse cells SC1 to SCn may be electrically connected with each other. That is, the transistors T1 to Tn of each of the synapse cells SC1 to SCn may be turned-on and turned-off at the same time.

The drain electrodes of the transistors T1 to Tn may be respectively electrically connected with the reference voltage nodes Vr1 to Vrn. The source electrodes of the transistors T1 to Tn may be respectively electrically connected with the first nodes of the memristors M1 to Mn. The second nodes of the memristors M1 to Mn may be electrically connected with the common post-synaptic neuron circuit 0 through the common column line C. The technical concepts of the invention can be understood with reference to FIGS. 5 and 10.

Figure 12:
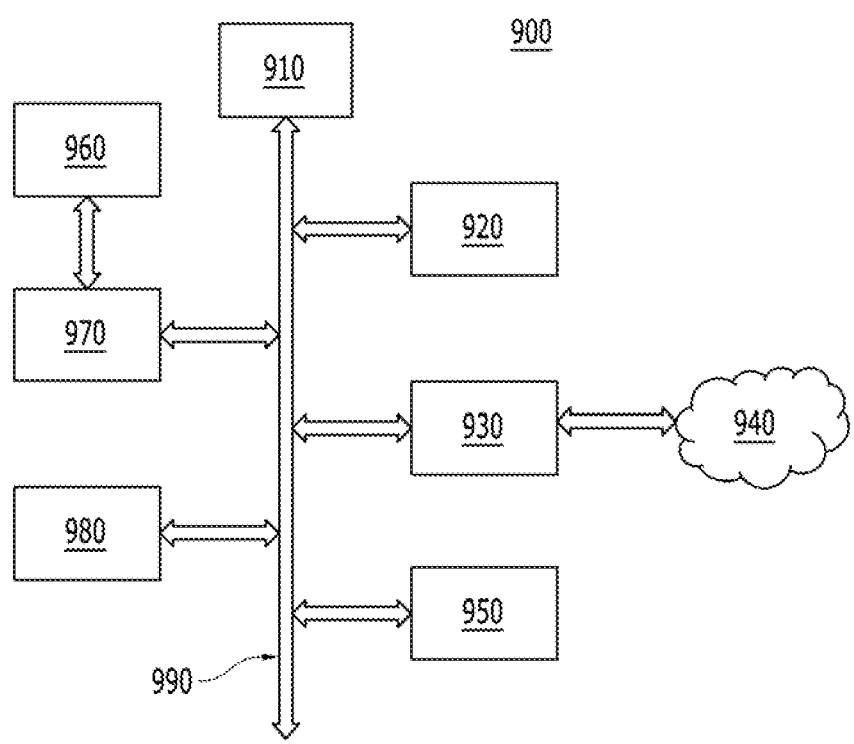
FIG. 12 is a diagram schematically illustrating a pattern recognition system in accordance with an embodiment of the present invention.

FIG. 12 is a diagram schematically illustrating a pattern recognition system 900 in accordance with an embodiment of the present invention. For example, the pattern recognition system 900 may include a speech recognition system, an imaging recognition system, a code recognition system, a signal recognition system, and one or more systems for recognizing various patterns.

Referring to FIG. 12, the pattern recognition system 900 may include a Central Processing Unit (CPU) 910, a memory unit 920, a communication control unit 930, a network 940, an output unit 950, an input unit 960, an Analog-Digital Converter (ADC) 970, a neuromorphic unit 980, and/or a bus 990. The CPU 910 may generate and transmit various signals for a learning process of the neuromorphic unit 980, and perform various processes and functions for recognizing patterns according to an output from the neuromorphic unit 980. For example, the CPU 910 may perform processes and functions for recognizing a speech and imaging patterns based on the output from the neuromorphic unit 980.

The CPU 910 may be connected with the memory unit 920, the communication control unit 930, the output unit 950, the ADC 970, and the neuromorphic unit 980 through the bus 990. The memory unit 920 may store various information, which are required to be stored in the pattern recognition system 900. The memory unit 920 may include one or more of a volatile memory device, such as DRAM or SRAM, a nonvolatile memory, such as PRAM, MRAM, ReRAM or NAND flash memory, and various memory units, such as Hard Disk Drive (HDD) and Solid State Drive (SSD).

The communication control unit 930 may transmit and/or receive data to and/or from a communication control unit of another system through the network 940. For example, the communication control unit 930 may transmit speech and/or image recognition data through the network 940.

The output unit 950 may output data in various manners. For example, the output unit 950 may include a speaker, a printer, a monitor, a display panel, a beam projector, a hologrammer, or other various output devices. The output unit 950 may output, for example, speech and/or image recognition data.

The input unit 960 may include a microphone, a camera, a scanner, a touch pad, a keyboard, a mouse, a mouse pen, or one or more of various sensors.

The ADC 970 may convert analog data inputted from the input unit 960 into digital data.

The neuromorphic unit 980 may perform learning or recognition using the data outputted from the ADC 970, and output data corresponding to recognized patterns. The neuromorphic unit 980 may include one or more of the neuromorphic devices in accordance with the various embodiments described above.

In accordance with the embodiments of the present invention, since the plurality of synapse cells can be used as one synapse, the synapse can be readily and accurately implemented.

In accordance with the embodiments of the present invention, data to be written and stored into the synapse cells can be pre-decided so that an additional training process shall not be needed and accurate data can be written and stored.

In accordance with the embodiments of the present invention, a variety of data with multiple levels can be stored depending on the number of the synapse cells.

In accordance with the embodiments of the present invention, the neuromorphic device can be easily realized by using a digital synapse structure such as a memory device, but not an analogue synapse structure.

Although various embodiments have been described for illustrative purposes, it will be apparent to those skilled in the art that various changes and modifications may be made without departing from the spirit and scope of the disclosure, as defined in the following claims.

What is claimed is:

1. A neuromorphic device including:
a plurality of pre-synaptic neuron circuits;
a plurality of post-synaptic neuron circuits; and
a plurality of synapses, each being electrically connected to the plurality of pre-synaptic neuron circuits and a corresponding one of the plurality of post-synaptic neuron circuits,
wherein:
each of the plurality of synapses comprise a first synapse cell, a second synapse cell, and a third synapse cell,
each of the first to third synapse cells is electrically connected to a corresponding one of the plurality of pre-synaptic neuron circuits through a corresponding one of a plurality of row lines, respectively,
each of the first to third synapse cells is electrically connected to the corresponding one of the plurality of post-synaptic neuron circuits through one common column line,
the first synapse cell comprises a first transistor having a first channel size and a first memristor,
the second synapse cell comprises a second transistor having a second channel size and a second memristor,
the third synapse cell comprises a third transistor having a third channel size and a third memristor,
the second channel size is greater than the first channel size,
the third channel size is greater than the second channel size, and
current driving efficiencies of the first to third transistors are different from one another.

2. The neuromorphic device of claim 1,
wherein each of the first to third transistors are electrically connected to the corresponding one of the plurality of row lines.

3. The neuromorphic device of claim 2,
wherein drain electrodes of the first to third transistors are electrically connected to the corresponding one of the plurality of row lines, respectively, and
wherein source electrodes of the first to third transistors are electrically connected to the first to third memristors, respectively.

4. The neuromorphic device of claim 2,
wherein the first to third memristors are electrically connected to the corresponding one of the plurality of row lines and drain electrodes of the first to third transistors, respectively, and
wherein source electrodes of the first to third transistors are commonly electrically connected to the common column line.

5. The neuromorphic device of claim 2,
wherein gate electrodes of the first to third transistors are electrically connected to the corresponding one of the plurality of row lines, respectively, and
wherein drain electrodes of the first to third transistors are directly connected to a reference voltage node.

6. The neuromorphic device of claim 1, wherein:
the first synapse cell comprises at least one transistors,
the second synapse cell comprises at least two transistors,
the third synapse cell comprises at least three transistors, and
the first to third of synapse cells comprise different numbers of transistors from one another.

7. The neuromorphic device of claim 6, wherein:
the transistors of the second synapse cell are electrically connected in parallel to each other, and
the transistors of the third synapse cell are electrically connected in parallel to one another.

8. The neuromorphic device of claim 7, wherein:
gate electrodes of the transistors of the second synapse cells are electrically connected to each other, and gate electrodes of the transistors of the third synapse cells are electrically connected one another.

9. The neuromorphic device of claim 6, wherein:

gate electrodes of the transistors of the second synapse cells are commonly electrically connected to the corresponding one of the plurality of row lines, and gate electrodes of the transistors of the third synapse cells are commonly electrically connected to the corresponding one of the plurality of row lines.

10. The neuromorphic device of claim 9, wherein:

drain electrodes of the transistors of the first to third synapse cells are directly electrically connected to a reference voltage node.

11. The neuromorphic device of claim 1, wherein the first to third memristors of the synapse cells have different fixed resistance values.

12. A neuromorphic device comprising:

a plurality of pre-synaptic neuron circuits;

a plurality of post-synaptic neuron circuits; and a plurality of synapses, each being electrically connected to the pre-synaptic neuron circuits and a corresponding one of the post-synaptic neuron circuits, wherein the plurality of synapses comprise a first synapse cell, a second synapse cell, and a third synapse cell, and wherein:

the first synapse cell has at least one transistors and a first memristor, the second synapse cell has at least two transistors and a second memristor, and the third synapse cell has at least three transistors and a third memristor, the first to third numbers are different from one another, and the first to third synapse cells having different current driving efficiencies, respectively.

13. The neuromorphic device of claim 12, wherein the first to third memristors of the first to third synapse cells have different fixed resistance values from one another.

14. The neuromorphic device of claim 12, wherein the first to third synapse cells are independently electrically connected to the pre-synaptic neuron circuits through a plurality of row lines, and commonly electrically connected to the corresponding one of the post-synaptic neuron circuits through common column line, respectively.

15. A neuromorphic device comprising:

first to third pre-synaptic neuron circuits;

a post-synaptic neuron circuit; and a first synapse cell electrically connected to the first pre-synaptic neuron circuit through a first row line and the post-synaptic neuron circuit through a common column line, a second synapse cell electrically connected to the first pre-synaptic neuron circuit through a second row line and the post-synaptic neuron circuit through the common column line, a third synapse cell electrically connected to the first pre-synaptic neuron circuit through a third row line and the post-synaptic neuron circuit through the common column line, wherein:

the first synapse cell comprises at least one transistors and a first memristor, the second synapse cell comprises at least two transistors and a second memristor, the third synapse cell comprises at least three transistors and a third memristor, gate electrodes of the transistors of the second synapse are electrically connected to each other, and gate electrodes of the transistors of the third synapse are electrically connected to each other.

* * * * *